United States Patent
Qiu et al.

(10) Patent No.: US 8,941,838 B2
(45) Date of Patent: Jan. 27, 2015

(54) BROADBAND FIBER LIGHT SOURCE WITH HIGH WAVELENGTH STABILITY UNDER RADIATION FOR IFOG APPLICATIONS

(71) Applicant: Honeywell International Inc., Morristown, NJ (US)

(72) Inventors: Tiequn Qiu, Glendale, AZ (US); Steven J. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 245 days.

(21) Appl. No.: 13/714,595

(22) Filed: Dec. 14, 2012

(65) Prior Publication Data
US 2014/0168655 A1 Jun. 19, 2014

(51) Int. Cl.
*G01C 19/72* (2006.01)
*H01S 3/067* (2006.01)

(52) U.S. Cl.
CPC .............. *H01S 3/067* (2013.01); *G01C 19/721* (2013.01)
USPC .......................................................... 356/460

(58) Field of Classification Search
USPC ........................................ 356/460; 359/341.3
See application file for complete search history.

(56) References Cited

U.S. PATENT DOCUMENTS

| | | | |
|---|---|---|---|
| 4,229,069 A | 10/1980 | Motin et al. | |
| 4,413,184 A | 11/1983 | Marrone | |
| 4,999,504 A | 3/1991 | Braunlich et al. | |
| 5,037,204 A | 8/1991 | Poisel et al. | |
| 6,087,666 A | 7/2000 | Huston et al. | |
| 6,130,981 A | 10/2000 | Nelson et al. | |
| 2012/0081781 A1* | 4/2012 | Peng et al. | 359/341.3 |

OTHER PUBLICATIONS

Peng et al., "Effects of Aluminum Doping Concentrations on Radiation Sensitivity of Erbium Doped Fibers", "21st International Conference on Optical Fiber Sensors", May 2011, pp. 1-4, vol. 7753.

* cited by examiner

*Primary Examiner* — Tarifur Chowdhury
*Assistant Examiner* — Jamil Ahmed
(74) *Attorney, Agent, or Firm* — Fogg & Powers LLC (57) ABSTRACT

A rare-earth-doped-fiber light source with wavelength stability includes a rare-earth doped fiber and an undoped fiber placed in proximity to each other and having the same host material and the same cross-sectional structure, a coupler configured to direct a first portion of pump power from a pump laser to the undoped fiber so the first portion of pump power was twice passed through the coupler; and a wavelength division multiplexer configured to input a second portion of pump power from the pump laser to the rare-earth doped fiber. The rare-earth doped fiber is an active medium for the broadband light source and includes a fiber core doped with rare-earth ions. The undoped fiber includes a rare-earth-dopant-free fiber core. The length of the undoped fiber is one of the same as that of the doped fiber or optimized to match a radiation sensitivity of the doped fiber.

19 Claims, 6 Drawing Sheets

BROADBAND FIBER LIGHT SOURCE WITH HIGH WAVELENGTH STABILITY UNDER RADIATION FOR IFOG APPLICATIONS

BACKGROUND

Rare-earth-doped-fiber light sources (FLS) are commonly used in interferometric fiber optic gyroscopes (IFOG) because of their high optical power, broad optical bandwidth, and high mean wavelength stability. There is an increasing demand for a small size, low weight IFOG to operate in radiation environments. As defined herein, a "radiation environment" is an environment including one or more of high energy particles (such as alpha particles) and high frequency radiation (including, but not limited to, X-rays and gamma rays) from sources such as a nuclear bomb, a nuclear reactor, the sun, or other extra-terrestrial radiation sources. The light propagating within a FLS and an IFOG is referred to herein as "light", "optical beam", or "optical pump beam". Although such optical beams are electro-magnetic radiation, the terms "light", "optical beam", and "optical pump beam" as used herein are not the radiation generated by high energy particles, the sun, and nuclear events.

Designing FLS to retain the above mentioned desired properties in a radiation environment is important. However, it is difficult to achieve high wavelength stability of a FLS under radiation. When an IFOG uses an FLS with an unstable wavelength, the IFOG scale factor stability is degraded through mean wavelength change and angle random walk is degraded through bandwidth reduction. In addition, radiation from high energy particles and/or high frequency radiation increase the loss within the whole gyro optical circuit. This power loss leads to a substantial reduction of the optical power at the rate detector of the IFOG, which also degrades the IFOG performance.

It is known in the art that it is possible to reduce the mean wavelength sensitivity of rare-earth-doped-fiber light sources (FLS) to radiation by narrowing the bandwidth of the fiber light source. However, this sacrifices the bandwidth of the FLS, and also reduces the efficiency of the rare-earth-doped-fiber light sources (FLS) in converting pump laser power to FLS output power. For IFOG applications, a wider bandwidth is better. For example, it is desirable for an optical signal coupled to an IFOG to have an approximately 40 nm bandwidth.

SUMMARY

The present application relates to a rare-earth-doped-fiber light source with wavelength stability. The rare-earth-doped-fiber light source includes a rare-earth doped fiber used as an active medium for the broadband light source, the rare-earth doped fiber having a host material and a cross-sectional structure, the cross-sectional structure of the rare-earth doped fiber including a fiber core doped with rare-earth ions. The rare-earth-doped-fiber light source also includes an undoped fiber having the same host material and the same cross-sectional structure as the rare-earth doped fiber. The cross-sectional structure of the undoped doped fiber includes a rare-earth-dopant-free fiber core. The undoped fiber and the rare-earth doped fiber are placed in proximity to each other. The length of the undoped fiber is one of the same as that of the doped fiber or optimized to match a radiation sensitivity of the doped fiber. The rare-earth-doped-fiber light source also includes a coupler configured to direct a first portion of pump power from a pump laser to the undoped fiber and a wavelength division multiplexer configured to input a second portion of pump power from the pump laser to the rare-earth doped fiber. The first portion of pump power was twice passed through the coupler.

DRAWINGS

In accordance with common practice, the various described features are not drawn to scale but are drawn to emphasize features relevant to the present invention. Like reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The rare-earth-doped-fiber light sources (FLS) described herein include three features to reduce the impact of radiation on FLS mean wavelength with no sacrifice of FLS output bandwidth and power. The three features are: 1) packaging an undoped fiber with a rare-earth doped fiber, which is made from the same host glass and has the same cross-sectional fiber geometry as the undoped fiber; 2) using an optical configuration of photodetectors and a coupler coupling the undoped fiber to an optical pump, so that an optical pump beam passes twice through the optical coupler; and 3) selecting the length of the rare-earth doped fiber to provide a sensitivity slope (in units of parts per million mean wavelength change for 1 mW pump power increase [ppm/mW]) that is in an appropriate range for the optimal control of the mean wavelength of the rare-earth-doped-fiber light source through pump power adjustment. The length of the undoped fiber is either the same as the length of the rare-earth doped fiber or is optimized to match the radiation sensitivity of the rare-earth doped fiber. Thus, the undoped fiber and the rare-earth doped fiber have the same effective length.

Figure 1:
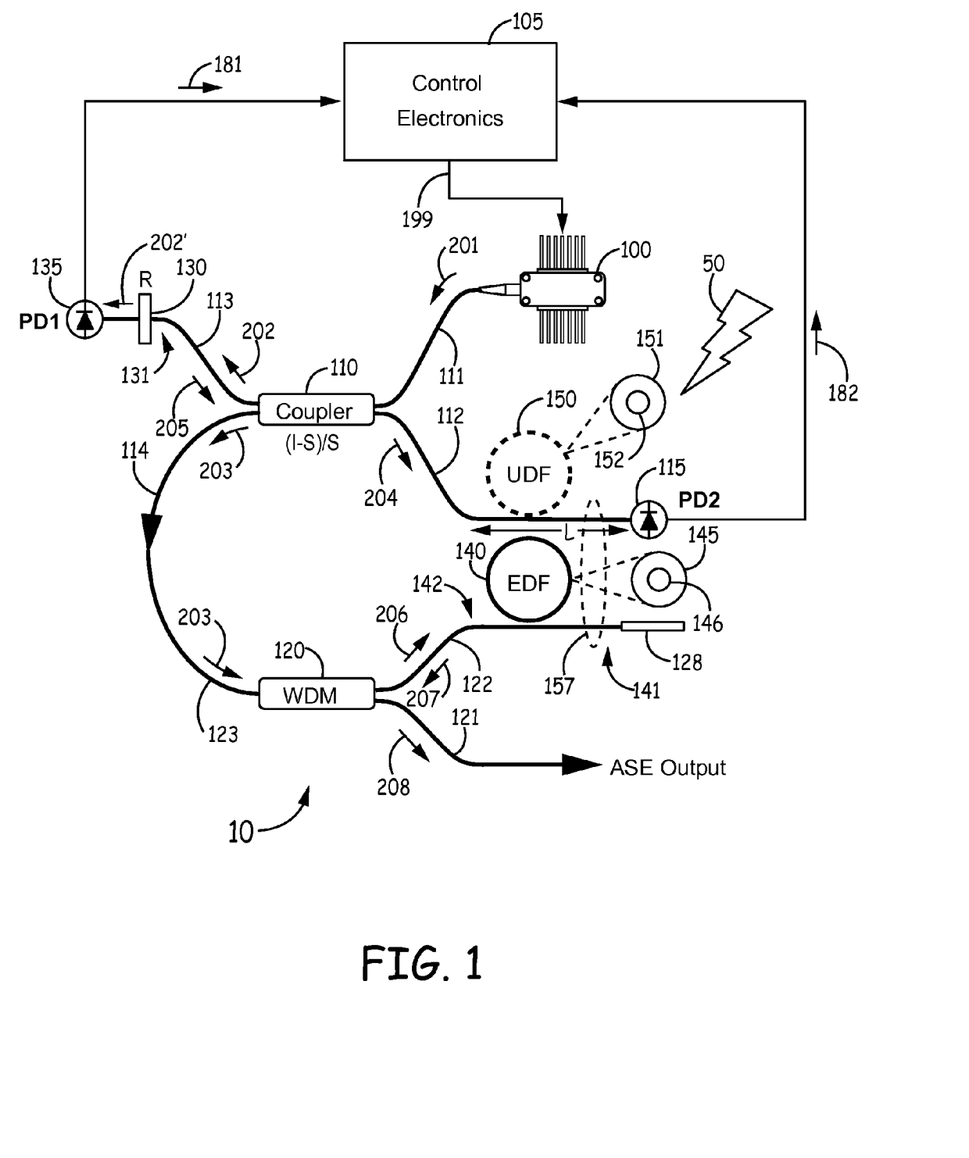
FIG. 1 is an embodiment of a rare-earth-doped-fiber light source with wavelength stability in a radiation environment in accordance with the present invention.

FIG. 1 is an embodiment of a rare-earth-doped-fiber light source 10 with wavelength stability in a radiation environment in accordance with the present invention. The rare-earth-doped-fiber light source 10 has a stable mean wavelength in all environments, including a radiation environment. Wavelength stability of the rare-earth-doped-fiber light source 10 is typically characterized by the ratio of mean wavelength change to the mean wavelength. For example, if the mean wavelength changed from 1550.0 nm to 1550.1 nm, the wavelength instability is 0.1/1550=0.000065=65 ppm. Depending on the system requirements, the stable mean wavelength of light source under radiation is defined as instability of less than a few hundred to a few thousand ppm. The radiation environment is represented generally as a lightning bolt 50. The "rare-earth-doped-fiber light source 10" is also referred to herein as "fiber light source 10" or "FLS 10". The FLS 10 includes a pump laser 100, an optical coupler 110, a wavelength division multiplexer (WDM) 120, a rare-earth doped fiber (EDF) 140, an undoped fiber (UDF) 150, a reflector 130, a terminating fiber 128, control electronics 105, a first photodiode 135, and a second photodiode 115.

The rare-earth doped fiber 140 is used as the active medium for the broadband light source. The rare-earth doped fiber has a host material and a cross-sectional structure. The cross-sectional structure shown extending from the rare-earth doped fiber 140 includes a fiber core 146 surrounded by a fiber cladding 145. The fiber core 146 of the rare-earth doped fiber 150 is doped with (includes) rare-earth ions.

The undoped fiber 150 has the same host material and the same cross-sectional structure as the rare-earth doped fiber 140. The cross-sectional structure shown extending from the undoped fiber 150 includes an undoped fiber core 152 surrounded by a fiber cladding 151. The undoped fiber core 152 of the undoped fiber 150 is independent of rare-earth ions. The cross-sectional structure is also referred to herein as a "cross-sectional geometrical structure" or "cross-sectional geometry". The undoped fiber core 152 of the undoped fiber 150 is also referred to herein as a "rare-earth-dopant-free fiber core 152" and the "undoped fiber 150" is also referred to herein as a "rare-earth-dopant-free fiber 150". In one implementation of this embodiment, the rare-earth-dopant-free fiber core of the rare-earth-dopant-free fiber 150 is doped with elements that are non-active dopants. The non-active dopants are used to modify the refractive index of the rare-earth-dopant-free fiber core 152. Non-active dopants are not rare-earth ions. Thus, as defined herein, the rare-earth-dopant-free fiber core 152 of the rare-earth-dopant-free fiber 150 is a fiber core 152 that does not include any rare-earth ions but, in some embodiments, includes non-active dopants that are not rare-earth ions. In one implementation of this embodiment, the length of the undoped fiber 150 is the same as the length of the rare-earth doped fiber 140. In another implementation of this embodiment, the length of the undoped fiber 150 is optimized to match the radiation sensitivity of the rare-earth doped fiber 140. The host material is also referred to herein as host-glass.

The core 152 of undoped fiber 150 is formed from a first host-glass and the rare-earth doped fiber 140 is formed by rare-earth doping the core of a second host-glass that is the same as first host-glass. In one implementation of this embodiment, the first host-glass and the second host-glass are formed form the same glass boule. The undoped fiber 150 has the same fiber cross-sectional geometry (structure) as the rare-earth doped fiber 140. In one implementation of this embodiment, the rare-earth doped fiber 140 is an Erbium doped fiber 140. In other embodiment, other rare-earth elements are used to dope the rare-earth doped fiber 140. The terms "rare-earth doped fiber 140", "doped fiber 140", and "Erbium doped fiber 140", and "EDF 140" are used interchangeably herein. The undoped fiber 150 is also referred to herein as "UDF 150". The undoped fiber 150 is placed adjacent to the rare-earth doped fiber 140. In one implementation of this embodiment, the undoped fiber 150 is bundled with the rare-earth doped fiber 140. For example, the undoped fiber 150 and the rare-earth doped fiber 140 are attached to each other with attachment fixtures represented generally at 157.

The undoped fiber 150 is used as a radiation sensing medium since radiation events cause changes in the optical transmission of an optical fiber. Specifically, the undoped fiber 150 is monitored for optical loss changes due to darkening or other damage to the undoped fiber 150 resulting from exposure to a radiation event. As defined herein, a radiation event occurs when the undoped fiber 150 and the closely positioned rare-earth doped fiber 140 are exposed to a radiation environment. Since the undoped fiber 150 is adjacent to rare-earth doped fiber 140 and shares the same fiber cross-sectional geometry, same effective length, and the same glass host, the undoped fiber 150 experiences the same radiation dose and dose rate as the rare-earth doped fiber 140. Thus, the undoped fiber 150 exhibits the same host-glass loss and loss-recovery dynamics as the rare-earth doped fiber 140. A rare-earth doped fiber 140 radiation dynamic model shows that host-glass loss is the dominant mechanism of the radiation induced wavelength change of a rare-earth doped light source 10. The non-active dopants, such as, Al, P and Ge, are used to modify the refractive index. Unlike the rare earth dopants, the non-active dopants are not related to the light source emission. The non-active dopants are the main contributors to the radiation sensitivity of the fiber.

In FIG. 1, the rare-earth doped fiber 140 and the undoped fiber 150 are shown as offset from each other (with the attachment fixtures 157 indicated as a dashed oval) for clarity of viewing the FLS 10, however the rare-earth doped fiber 140 and the undoped fiber 150 are placed side-by-side during operation of the FLS 10. The rare-earth doped fiber 140 and the undoped fiber 150 have the same effective length represented generally at L. In one implementation of this embodiment, the rare-earth doped fiber 140 and the undoped fiber 150 are bundled together while they are stretched out adjacent to each other. Then the rare-earth doped fiber 140 and the undoped fiber 150 are attached to each other using attachment fixtures 157 at various points along the length of the fibers 140 and 150. Then the two fibers 140 and 150 are coiled for placement in the FLS 10. The attachment fixtures 157, which attach the EDF 140 and the UDF 150 to each other, include, but are not limited to, one or more of clips, tape, sheaths, ribbon, suture, heat shrinking wrap, and tubes.

In another implementation of this embodiment, the rare-earth doped fiber 140 and the undoped fiber 150 are stretched out adjacent to each other, coiled as a pair of fibers, and then attached to each other using attachment fixtures 157. In this manner, the rare-earth doped fiber 140 and the undoped fiber 150 are placed and held in proximity to each other.

The optical coupler 110 is also referred to herein as "coupler 110". The coupler 110 includes a first-optical-fiber arm 111, a second-optical-fiber arm 112, a third-optical-fiber arm 113, and a fourth-optical-fiber arm 114. The "first-optical-fiber arm 111, second-optical-fiber arm 112, third-optical-fiber arm 113, and fourth-optical-fiber arm 114" of the coupler 110 are also, respectively, referred to herein as "first arm 111, second arm 112, third arm 113, and fourth arm 114". In one implementation of this embodiment, the wavelength division multiplexer 120 has good isolation so that no light generated from the doped fiber can return to the coupler 110. The WDM is preferably radiation insensitive. In another implementation of this embodiment, the reflector 130 is preferably compact and radiation insensitive.

The control electronics 105 monitors the undoped fiber 150 loss based on a first feedback signal represented generally at 181 and a second feedback signal represented generally at 182 input from the first photodiode 135 and the second photodiode 115, respectively, as described below. The control electronics 105 adjust the current used to drive the pump laser 100 when the optical loss changes because of, for example, a radiation event changing the transmission properties of the undoped fiber 150. If a radiation event changes the transmission properties of the undoped fiber 150, the radiation event also changes the transmission properties of the rare-earth doped fiber 140 that is in close proximity to the undoped fiber 150. The first feedback signal 181 and the second feedback signal 182 from the first photodiode 135 and the second photodiode 115, respectively, are used by the control electronics 105 to determine and adjust the pump power $P_{pump}$ output from the optical pump 100 as required to correct the wavelength output by the FLS 10. The pump power $P_{pump}$ is an optical power used to pump the doped fiber 140.

The operation of the rare-earth-doped-fiber light source 10, which has a stable wavelength, before, during, and after a radiation event, is now described. The pump laser 100 outputs an optical pump beam represented generally at 201 into a first arm 111 of the optical coupler 110. The optical pump beam 201 has an optical power of $P_{pump}$. The coupler 110 splits a first portion (represented generally as optical beam 202) of the optical pump beam 201 into the third arm 113 of the coupler 110. The coupler 110 splits a second portion (represented generally as optical beam 203) of the optical pump beam 201 into the fourth arm 114 of the coupler 110. The first portion 202 of the optical pump beam 201 is also referred to herein as "optical beam 202". The second portion 203 of the optical pump beam 201 is also referred to herein as "optical beam 203". The ratio of the first portion 202 to the second portion 203 is the splitting ratio (represented generally as (1−S)/S) of the coupler 110. Thus, the optical beam 202 has an optical power of $P_{pump} \cdot S$ and the optical beam 203 has an optical power of $P_{pump} \cdot (1-S)$.

In one implementation of this embodiment, the first portion 202 is 5% of the optical pump beam 201 and the second portion 203 is 95% of the optical pump beam 201. In this case, the splitting ratio (1−S)/S of the coupler 110 is 95/5. In another implementation of this embodiment, the first portion is 2% of the optical pump beam 201 and the second portion 203 is 98% of the optical pump beam 201. In this case, the splitting ratio of the coupler 110 is 98/2.

The reflector 130 is positioned at an output represented generally at 131 of the third arm 130. The reflector reflects R of the optical beam 202 and transmits (1−R) of the optical beam 202, where R is a number less than one and greater than zero (i.e., 1>R>0). The portion of the optical beam 202 that is transmitted through the reflector 130 is represented generally at 202'. Thus, the optical beam 202' has an optical power of $P_{pump} \cdot S \cdot (1-R)$. The optical beam 202' is incident on the first photodetector 135. The first photodetector 135 outputs the first feedback signal 181 indicative of the optical power ($P_1 = P_{pump} \cdot S \cdot (1-R)$) of the optical beam 202' incident on the first photodetector 135 to the control electronics 105. In one implementation of this embodiment, the reflector 130 reflects 2% of the optical beam 202 and transmits 98% of the optical beam 202 as optical beam 202'. In another implementation of this embodiment, the reflector 130 reflects 10% of the optical beam 202 and transmits 90% of the optical beam 202 as optical beam 202'. Other splitting ratios are possible.

The optical beam 205 that is partially reflected by the reflector 130 has an optical power of $P_{pump} \cdot S \cdot R$. The optical beam 205 that is partially reflected by the reflector 130 back to the coupler 110 is split a second time by the coupler 110. A larger percentage (the higher number (1−S) in the splitting ratio) of the optical beam 205 is transmitted from the third arm 113 through the coupler 110 to the undoped fiber 150 via the second arm 112 as an optical beam represented generally at 204. The optical beam 204 is also referred to herein as "a first portion 204" of pump power $P_{pump}$ from a pump laser 100 that has twice passed through the coupler 110 to the undoped fiber 150. The optical beam 204 has an optical power of $P_{pump} \cdot S \cdot R \cdot (1-S)$.

A smaller percentage (the lower number S in the splitting ratio) of the optical beam 205 is transmitted from the third arm 113 through the coupler 110 back to the pump laser 100 via the first arm 111. The pump laser 100 is packaged with an isolator (not shown) between the laser diode and the first arm 111, so the light reflected from the reflector 130 and passed back through the first arm 111 of the coupler 110 does not degrade the performance of the pump laser 100.

The optical beam 204 is transmitted through the undoped fiber 150 and is incident on the second photodetector 115. The second photodetector 115 outputs the second feedback signal 182 indicative of the optical power ($P_2$) of the optical beam 204 incident on the second photodetector 115 to the control electronics 105. The optical power of the optical beam 204 that is incident on the second photodetector 115 is $P_2 = P_{pump} \cdot S \cdot R \cdot (1-S) \cdot (1-L_n-L_r)$, where $L_n$ is the percentage loss of undoped fiber 150 under normal non-radiation environment, and $L_r$ is the percentage loss of the undoped fiber 150 during a radiation event.

The power ratio $P_2/P_1$ is an accurate indicator of losses in the undoped fiber 150 (and the proximally packaged EDF 140) due to a radiation event. The ratio $P_2/P_1 = R \cdot (1-S) \cdot (1-L_n-L_r)/(1-R)$. The ratio $P_2/P_1$ is independent of both the pump power $P_{pump}$ and the smaller term S of the splitting ratio (1−S)/S of the coupler 110.

The control electronics 105 is used to calculate the power ratio $P_2/P_1$ and to adjust the current applied to the pump laser 100 to maintain the mean wavelength of the FLS 10 if the power ratio $P_2/P_1$ changes as described below. The power ratio $P_2/P_1$ is also referred to herein as "ratio". When the ratio decreases in value, the doped fiber 150 has experienced loss due to a radiation event and the control electronics 105 increase the current applied to the pump laser 100. At a fixed pump power, the FLS 10 mean wavelength decreases. An increase in the pump power $P_{pump}$ increases the FLS mean wavelength so that it can offset the radiation induced mean wavelength change.

When the ratio increases in value after a radiation event is over, the doped fiber 150 is recovering from the radiation event and the attenuation from the radiation event is reduced, at least in part. In this case, the control electronics 105 decreases the current applied to the pump laser 100. A decrease in the pump power decreases the FLS mean wavelength so that it can offset the mean wavelength change during the recovery period.

The optical beam 203 propagates through the fourth arm 114 of the coupler 110 to the wavelength division multiplexer (WDM) 120. The WDM 120 includes an input-optical-fiber arm 123, a first-output-optical-fiber arm 121 and a second-output-optical-fiber arm 122. The input-optical-fiber arm 123, first-output-optical-fiber arm 121, and second-outputoptical-fiber arm 122 are also referred to herein as input arm 123, first-output arm 121, and second-output arm 122, respectively.

The fourth arm 114 of the coupler 110 is spliced (or otherwise coupled) to the input arm 123 of the WDM 120. Most (or all) of the optical beam 203 is directed by the WDM 120 to the rare-earth doped fiber 140 via the second-output arm 122 as optical beam 206. The optical beam 206 is also referred to herein as "second portion 206 of pump power $P_{pump}$ from the pump laser 100". The optical beam 206 has an optical power of $\sim P_{pump} \cdot (1-S)$. The second-output arm 122 is spliced (or otherwise coupled) to an input end represented generally at 142 of the rare-earth doped fiber 140. In this manner, the rare-earth doped fiber 140 is optically pumped by the second portion 206 of the pump power from the pump laser 100 output from the first-output arm 122.

As the optical beam 206 is coupled into and propagates through the rare-earth doped fiber 140, amplified spontaneous emission (ASE) over a broad spectrum of frequencies is generated (as is known in the art). The backscattered portion of the broadband amplified spontaneous emission represented generally at 207 is coupled into the WDM 120 via the second-output arm 122. The WDM 120 reflects the amplified spontaneous emission 207 into the first-output arm 121 as amplified spontaneous emission 208. This broadband amplified spontaneous emission 208 is the output from the rare-earth-doped-fiber light source 10.

The wavelength peak and wavelength range of the broadband amplified spontaneous emission 208 is stably controlled based on the calculation of the power ratio $P_2/P_1$. Any required adjustment of the current applied to the pump laser 100 is determined by the control electronics 105 responsive to the calculated the power ratio $P_2/P_1$ and the data about the effects of radiation on the undoped fiber 150, which is stored in the control electronics 105 or is accessible to the control electronics 105. Thus, the amplified spontaneous emission 208 has a high optical power, a broad optical bandwidth, and a high mean wavelength stability even if the FLS 10 is exposed to a radiation event.

As shown in FIG. 1, the output end 141 of the rare-earth doped fiber 140 is terminated with a terminating fiber 128 to absorb light emitted from the output end represented generally at 141 of the rare-earth doped fiber 140. In another implementation of this embodiment, there is no terminating fiber 128 at the output from the output end 141 of the rare-earth doped fiber 140. A reflector may be used at the end 141 to reflect ASE back to the rare-earth doped fiber to increase the efficiency. However, this method requires careful design to avoid instabilities of the light source.

This optical configuration of the rare-earth-doped-fiber light source 10, in which light passes twice through the optical coupler 110, reduces the impact of any coupler splitting ratio change due to exposure to a radiation event. As described above, the ratio $P_2/P_1 = R \cdot (1-S) \cdot (1-Ln-Lr)/(1-R)$ is independent of both the pump power $P_{pump}$ and the smaller term S of the splitting ratio (1-S)/S of the coupler 110. This is advantageous, since the splitting ratio (1-S)/S of the coupler 110 is liable to be sensitive to a radiation event. The radiation dependence of the ratio $P_2/P_1$ on the larger term (1-S) of the splitting ratio (1-S)/S is much less sensitive than the smaller term S of the splitting ratio (1-S)/S. Specifically, if an exemplary splitting ratio of 95/5 changes by 1% to 96/4, the smaller S term changes by 25% (e.g., (5/4)/5=0.25). In that same case, the larger (1-S) term changes by only 1.05% (e.g., (95/96)/95=0.0104).

After calibration, the initial loss of the undoped fiber 150 in non-radiation environment $L_n$ is measured and stored in the control electronics 105 (or in a memory communicatively coupled to the control electronics 105). The control electronics 105 is used to calculate the $P_2/P_1$ and to appropriately adjust the pump current applied to the pump laser 100 to ensure the mean wavelength of the amplified spontaneous emission 208 remains stable at the same wavelength and that the amplified spontaneous emission 208 bandwidth is maintained during and after a radiation event. As shown in FIG. 1, the control signal 199 is sent from the control electronics 105 to the pump laser 100 to adjust the pump current applied to the pump laser 100. In this manner, if a radiation insensitive reflector 130 is used, the power ratio of $P_2/P_1$ is an accurate indicator of the loss due to a radiation event in the undoped fiber 150 and in the proximally packaged EDF 140.

In one typically implementation of this embodiment that uses erbium doped fiber, the peak wavelength of the amplified spontaneous emission 208 is 1530 nm and the bandwidth of the amplified spontaneous emission 208 extends from 1525 nm to 1565 nm with mean wavelength around 1544 nm. Typical bandwidth of the amplified spontaneous emission 208 is about 35 to 40 nm.

The rare-earth doped fiber 140 in the rare-earth-doped-fiber light source 10 is designed for optimal mean wavelength stability control as described in detail below. Specifically, the length of the rare-earth doped fiber 140 is designed to provide a sensitivity slope (in unit of ppm/mW) that is appropriate for simultaneous wavelength and power stabilization. In an embodiment in which the FLS 10 is an optical source for an IFOG, the power output from the FLS 10 that is maintained for wavelength stability also mitigate the radiation induced losses of the IFOG by selecting proper length of the rare-earth doped fiber 140.

Figure 2:
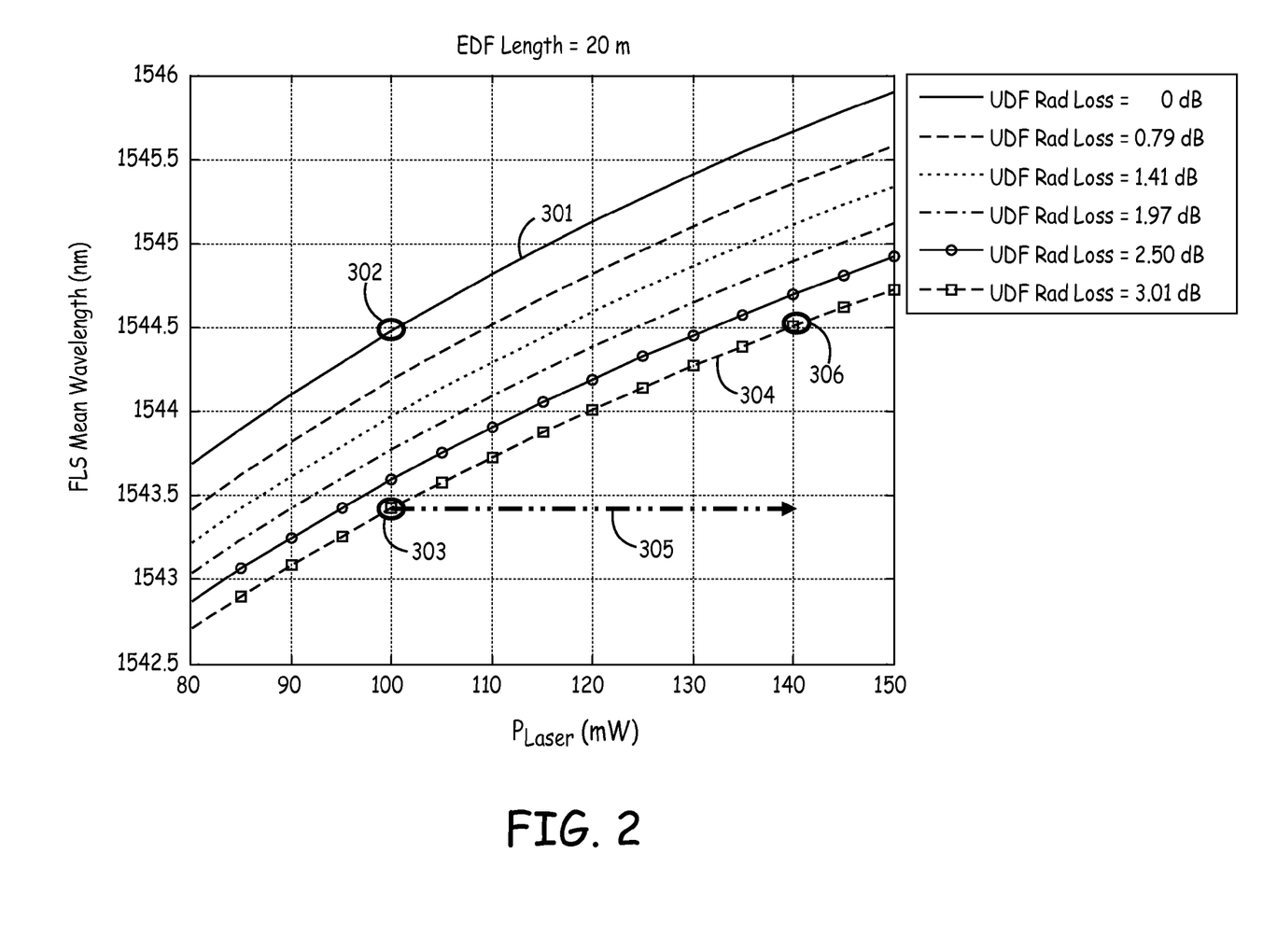
FIG. 2 shows a plot of mean wavelength dependence of the rare-earth-doped-fiber light sources (FLS) on pump power for several different radiation induced losses in a 20 meter length of rare-earth doped fiber.

FIG. 2 shows a plot of a mean wavelength dependence of the FLS 10 on pump power $P_{pump}$ for several different radiation induced losses in a 20 meter length of rare-earth doped fiber 140. The length of the rare-earth-doped fiber 140, which is equal to the length of the undoped fiber 150, is also referred to herein as "EDF length". The FLS mean wavelength ($\lambda_{mean}$) is the mean wavelength of the amplified spontaneous emission 180 output from the undoped fiber 150 in the FLS 10. The FLS mean wavelength ($\lambda_{mean}$) is a complicated function of fiber length (EDF length), fiber type, radiation dose (kilorad), dose rate (kilorad/hour), fiber temperature, and radiation history. At a fixed pump power $P_{pump}$, the FLS mean wavelength $\lambda_{mean}$ decreases as loss increases in the host glass of both the UDF 150 and the EDF 140. An increase in the pump power $P_{pump}$ increases the FLS mean wavelength $\lambda_{mean}$. The control electronics 105 functions to offset any radiation induced wavelength change in the FLS 10, based on the calculated power ratio $P_2/P_1$, by increasing the pump power $P_{pump}$ to return the FLS mean wavelength after or during a radiation event, back to the original and desired FLS mean wavelength.

As shown in FIG. 2, for an undoped fiber 150 that has 0 dB losses, the pump laser 100 must output 100 mW of pump power $P_{pump}$ to output amplified spontaneous emission 180 at a FLS mean wavelength of 1544.5 nm from the doped fiber 140 (see circle 302 on plot 301). If a radiation event occurs, which results in 3.01 dB losses in the undoped fiber 150, and which is determined at the control electronics 105 based on the calculated power ratio $P_2/P_1$, the FLS mean wavelength drops to less than 1543.5 nm (see circle 303 on plot 304). In order to bring the FLS mean wavelength back to 1544.5 nm, the pump current applied to the pump laser 100 must increase to increase the pump power $P_{pump}$. The dashed arrow 305 indicates the pump power $P_{pump}$ output from the pump laser 100 is increased from 100 mW to 140 mW. As shown by circle 306 on plot 304, when the UDF 150 experiences a 3.01 dB radiation loss, the pump power $P_{pump}$ output from the pump laser 100 is increased to 140 mW so the mean wavelength of the FLS 10 is maintained at 1544.5 nm. In this manner, the control electronics adjusts the pump current applied to the pump laser 100 to compensate for the 3.01 dB radiation losses in the UDF 150 (and the correlated 3.01 dB radiation losses in the EDF 140). Advantageously, the increased pump power $P_{pump}$ output from the pump laser 100 also offsets attenuation of the optical beam 206 (FIG. 1) propagating in the EDF 140 due to the radiation induced losses in the EDF 140.

Figure 3A:
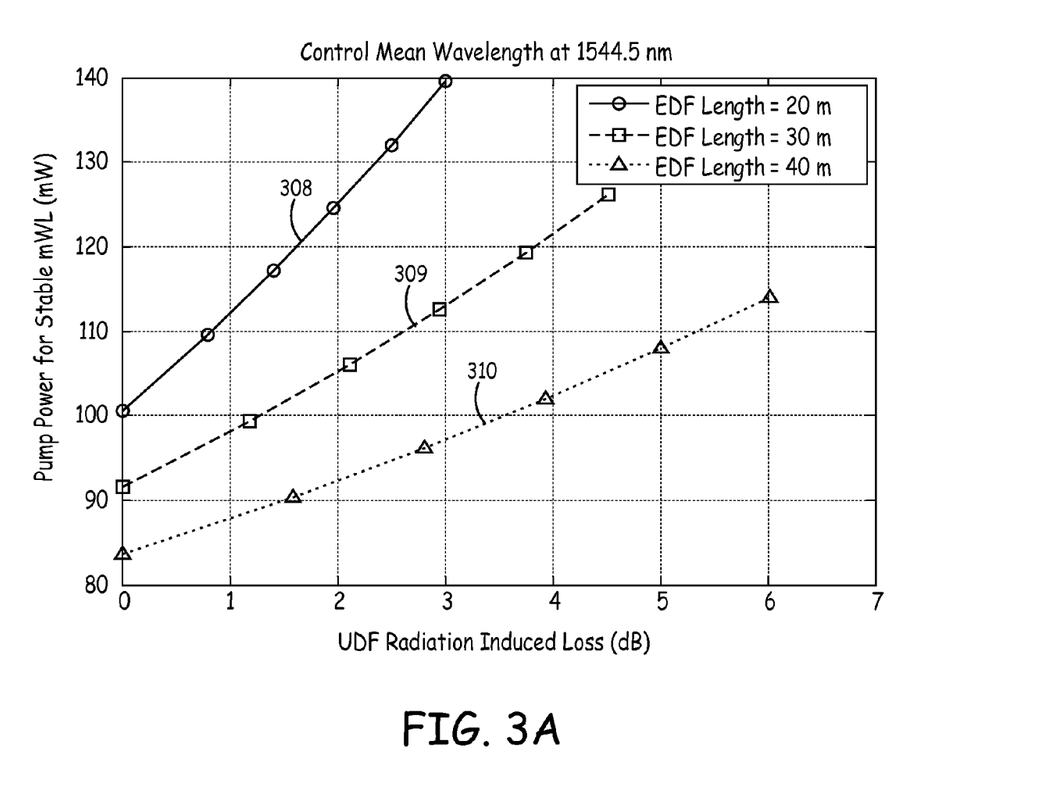
FIG. 3A shows plots of pump power as a function of radiation induced losses in an undoped fiber required to maintain the FLS mean wavelength at a constant mean wavelength.
Figure 3B:
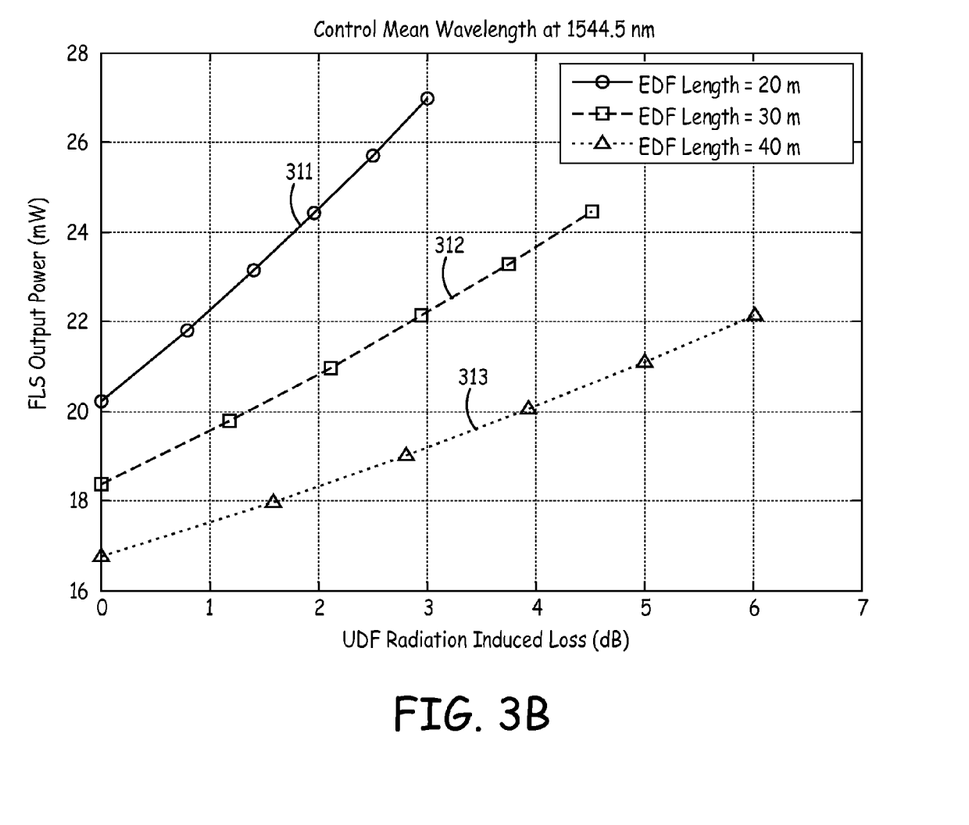
FIG. 3B shows plots of the FLS output power as a function of radiation induced losses in the undoped fiber required to maintain the FLS mean wavelength at a constant mean wavelength.

There is a specific wavelength-vs.-pump power sensitivity for a given EDF length. FIG. 3A shows plots of pump power $P_{pump}$ as a function of radiation induced losses in an undoped fiber 150 required to maintain the FLS mean wavelength $\lambda_{mean}$ at a constant mean wavelength $\lambda_{mean,fixed}$. FIG. 3B shows plots of the FLS output power (broadband amplified spontaneous emission 208) as a function of radiation induced losses in the undoped fiber 150 required to maintain the FLS mean wavelength $\lambda_{mean}$ at a constant mean wavelength $\lambda_{mean,fixed}$. FIGS. 3A and 3B include plots for EDF lengths of 20 m, 30 m, and 40 m. The constant mean wavelength $\lambda_{mean,fixed}$ maintained for the measurements plotted in FIGS. 3A and 3B is 1544.5 nm.

As shown in plot 308, the 20 m length rare-earth doped fiber 140 requires a pump power increase from 100 mW to about 125 mW (i.e., $\Delta P_{pump}$=25 mW) when the loss in the UDF 150 increases from 0 dB to 2 dB. As shown in plot 309, the 30 m length rare-earth doped fiber 140 requires a pump power increase from 91 mW to about 105 mW (i.e., $\Delta P_{pump}$=14 mW) when the loss in the UDF 150 increases from 0 dB to 2 dB. As shown in plot 310, the 40 m length rare-earth doped fiber 140 requires a pump power increase from about 83 mW to about 92 mW (i.e., $\Delta P_{pump}$~9 mW) when the loss in the UDF 150 increases from 0 dB to 2 dB. If the wavelength versus pump power sensitivity for a given EDF length is low, more pump power change is required to correct a radiation induced mean wavelength shift.

As shown in FIG. 3B, for a given radiation environment, the output power increase required to maintain fixed-wavelength operation is larger for the 20 m length rare-earth doped fiber (plot 311) than the 30 m length rare-earth doped fiber (plot 312) or the 40 m length rare-earth doped fiber (plot 313).

The control electronics 105 includes a memory to store data including: 1) the mean wavelength dependence of the FLS 10 on pump power for several different radiation induced losses for a range of EDF lengths of rare-earth doped fiber 140; 2) pump power change required, as a function of radiation induced losses in the undoped fiber, for a range of EDF lengths to maintain the FLS mean wavelength at a constant mean wavelength; and 3) the FLS output power, as a function of radiation induced losses in the undoped fiber, for a range of EDF lengths to maintain the FLS mean wavelength at a constant mean wavelength.

In one implementation of this embodiment, the control electronics 105 is prepared for a single EDF length. In that case, the memory in (or accessible to) the control electronics 105 stores data store data including: 1) the mean wavelength dependence of the FLS 10 on pump power for several different radiation induced losses for the specific EDF length of rare-earth doped fiber 140; 2) pump power change required, as a function of radiation induced losses in the undoped fiber, for the specific EDF length to maintain the FLS mean wavelength at a constant mean wavelength; and 3) the FLS output power, as a function of radiation induced losses in the undoped fiber, for the specific EDF length to maintain the FLS mean wavelength at a constant value. In this latter embodiment, if the UDF 150 and EDF 140 in the FLS 10 are replaced with a UDF 150 and an EDF 140 having another EDF length, the control electronics 105 is prepared for the new EDF length and the data in the memory is upgraded to store data for the new EDF length. In one implementation of this embodiment, the broadband amplified spontaneous emission 208 output from the FLS 10 is input to an interferometric fiber optic gyroscope.

Figure 4:
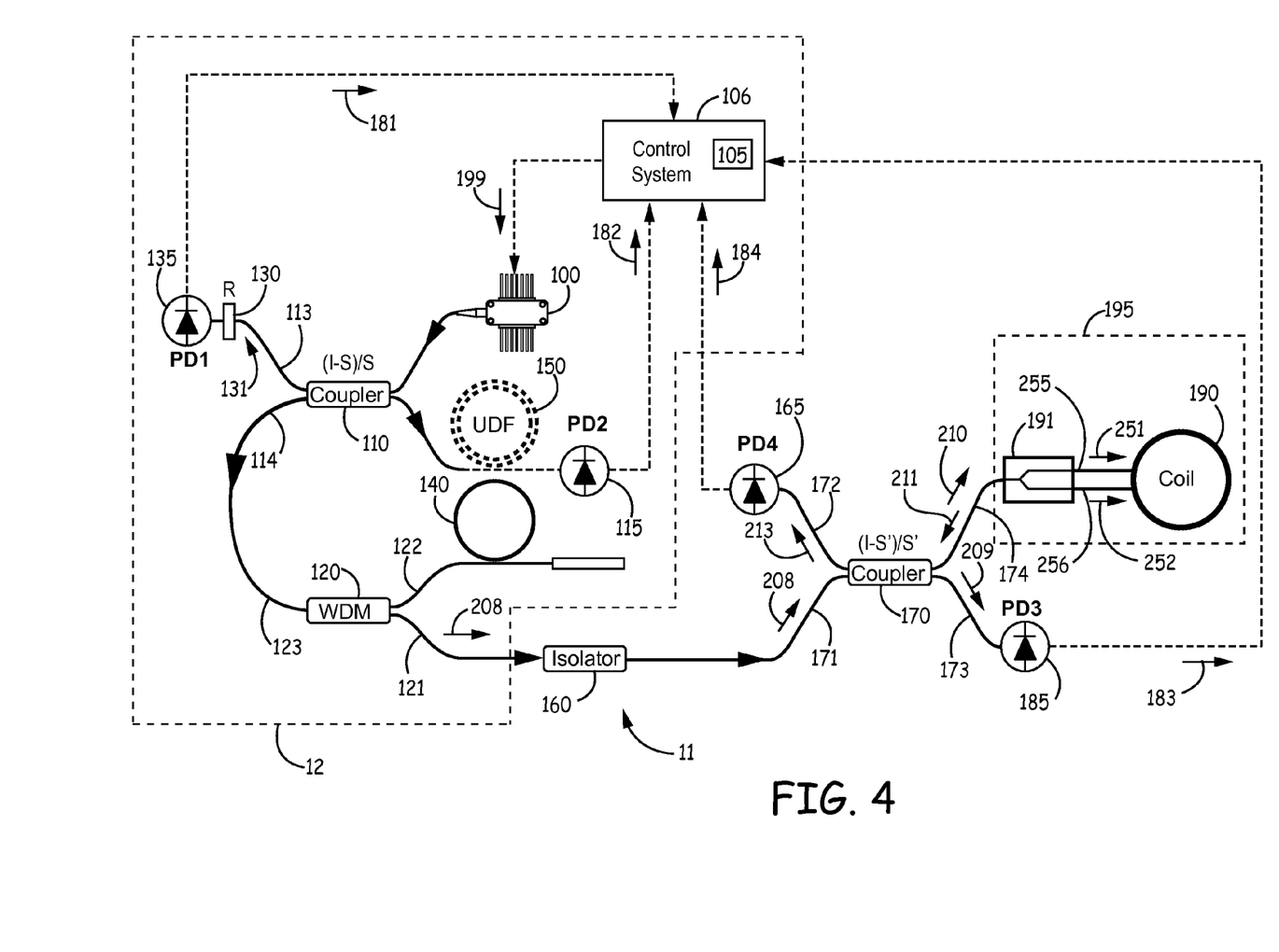
FIG. 4 shows an interferometric fiber optic gyroscope including a rare-earth-doped-fiber light source with wavelength stability in a radiation environment in accordance with the present invention.

FIG. 4 shows an interferometric fiber optic gyroscope including a rare-earth-doped-fiber light source with wavelength stability in a radiation environment in accordance with the present invention. The interferometric fiber optic gyroscope 11 including an isolator 160, a first coupler 170, a third photodiode 185, a fourth photodiode 165, an optical splitter 191, a gyroscopic sensing coil 190, and a rare-earth-doped-fiber light source 12 (FLS 12) with wavelength stability in an radiation environment. In one implementation of this embodiment, the optical splitter 191 is an integrated optical chip (IOC) 191. In another implementation of this embodiment, the optical splitter 191 includes bulk and/or integrated optical components.

The rare-earth-doped-fiber light source 12 has the functionality of the rare-earth-doped-fiber light source 10 described above with reference to FIGS. 1, 2, 3A, and 3B. The rare-earth-doped-fiber light source 12 (FLS 12) includes most of the components of the rare-earth-doped-fiber light source 10. However, the control electronics 105 in the rare-earth-doped-fiber light source 10 is incorporated in a control system 106. The control system 106 differs from the control electronics 105 in that it also inputs data from a third photodiode 185, a fourth photodiode 165 as well as from the first photodiode 135, and the second photodiode 115.

The amplified spontaneous emission 208 is output from the first-output arm 121 to an isolator 160. The output from the isolator 160 is input to first arm 171 of the first coupler 170. The coupler 110 in the FLS 12 is also referred to herein as second coupler 110. The first coupler 170 is functionally similar to the second coupler 110 with a splitting ratio (1−S')/S', where S' is a number less than one and greater than zero (i.e., 1>S'>0). S' is less than (1−S') (i.e., S'<(1−S')).

The first coupler 170 splits a first portion (1−S') of the amplified spontaneous emission 208 from the FLS 12 and directs it as optical beam 210 to the optical splitter 191. The optical splitter 191 splits (amplitude divides) the larger first portion (1−S') of the amplified spontaneous emission 208 into a clockwise optical beam represented generally at 251 and a counterclockwise beam represented generally at 252. The clockwise optical beam 251 and a counterclockwise beam 252 are input to the clockwise end represented generally at 255 and a counterclockwise end represented generally at 256 of the gyroscopic sensing coil 190. The rate signals output from the gyroscopic sensing coil 190 are indicative of a rotation rate as known to those skilled in the art. The optical splitter 191 and the gyroscopic sensing coil 190 for an interferometric fiber optic gyroscope (IFOG) 195 are representative of any one of known and future developed interferometric fiber optic gyroscopes.

The first coupler 170 splits a second portion (S') of the amplified spontaneous emission 208 from the FLS 12 and directs it to the third photodetector 185 as optical beam 209. The third photodetector 185 outputs a third feedback signal represented generally at 183 indicative of the optical power of the optical beam 209 incident on the third photodetector 185 to the control system 106. The optical power of the optical beam 209 is proportional to a second portion (S') of the amplified spontaneous emission 208 that is input to the optical splitter 191 and the gyroscopic sensing coil 190. The third feedback signal 183 is output from the third photodetector 185 to the control system 106. The feedback signal 183 from the third photodetector 185 is referred to herein as a "third feedback signal 183".

The rate signals output from the gyroscopic sensing coil 190 are represented generally as optical beam 211. The first coupler 170 splits a smaller portion (S') of the optical beam 211 to the fourth photodetector 165. The fourth photodetector 165 outputs a fourth feedback signal represented generally at 184 indicative of the optical power of the optical beam 213 incident on the fourth photodetector 165 to the control system 106. The optical beam 213 contains information of rotation rate of the gyroscopic sensing coil 190. The control system 106 determines the rotation rate of the gyroscopic sensing coil 190 based on the third feedback signal 183 and the fourth feedback signal 184.

Since the amplified spontaneous emission 208 input to the gyroscopic sensing coil 190 has same mean wavelength and bandwidth, even when the FLS 12 is exposed to radiation, the scale factor stability, which is based on mean wavelength stability, and angle random walk, which is based on bandwidth stability, of the IFOG 195 are not degraded when the FLS 12 is exposed to radiation. In addition, even when the FLS 12 is exposed to radiation there is a smaller or no reduction of the optical power at the gyroscopic sensing coil 190 of the IFOG 195 so high performance of the IFOG 195 is maintained during and after exposure to a radiation event. A variable optical attenuator may be used to control the optical power at a constant level at the rate detector 165.

If the optical damage to the UDF 150 and the EDF 140 recovers over time, the FLS 12 (and FLS 10) described herein adjust the current to the laser 100 so that the mean wavelength and bandwidth remain constant.

Figure 5:
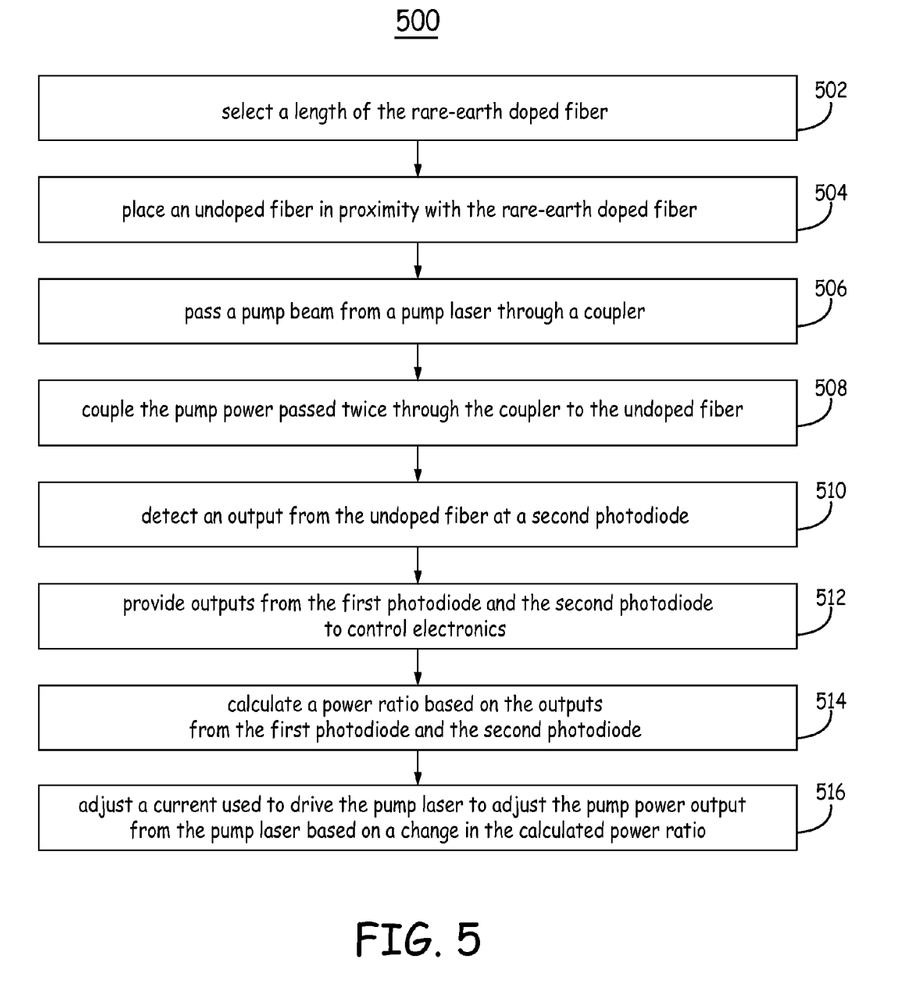
FIG. 5 is a flow diagram of an embodiment of a method to reduce the impact of radiation on a mean wavelength of a rare-earth-doped-fiber light source in accordance with the present invention.

FIG. 5 is a flow diagram of an embodiment of a method 500 to reduce the impact of radiation on the mean wavelength of a rare-earth-doped-fiber light source in accordance with the present invention. Method 500 is described with reference to the FLS 10 of FIG. 1.

At block 502, the length L of the rare-earth doped fiber 140 is selected to provide a sensitivity slope in an appropriate range for the optimal control of the mean wavelength of the rare-earth-doped-fiber light source. FIGS. 2, 3A, and 3B show the exemplary trends that need to be considered when selecting the length of the erbium doped fiber 140. In one implementation of this embodiment, the length of the undoped fiber 150 is set equal to the length L of the rare-earth doped fiber 140. In another implementation of this embodiment, the length of the undoped fiber 150 is selected to match the radiation sensitivity of the rare-earth doped fiber 140 so the undoped fiber 150 and the rare-earth doped fiber 140 have the same effective length. The undoped fiber 150 is in every aspect identical to the rare-earth doped fiber 140 except the rare-earth ions are not doped in the core 152 of the undoped fiber 150.

At block 504, the undoped fiber 150 is placed in proximity with the rare-earth doped fiber 140. In one implementation of this embodiment, the undoped fiber 150 is placed in proximity with the rare-earth doped fiber 140 by attaching the undoped fiber 150 in proximity with the rare-earth doped fiber 140 with attachment fixtures.

At block 506, a pump beam from a pump laser 100 is passed through a coupler 110. A first portion of the pump power $P_{pump}$ is coupled into a first photodiode 135 and a second portion of the pump power $P_{pump}$ optically pumps the rare-earth doped fiber 140.

At block 508, the pump power $P_{pump}$ passed twice through the coupler 100 is coupled to the undoped fiber 150. At block 510, an output from the undoped fiber is detected at a second photodiode 115.

At block 512, outputs from the first photodiode 135 and the second photodiode 115 are provided to control electronics 105. At block 514, the control electronics 105 calculates a power ratio based on the outputs from the first photodiode 135 and the second photodiode 115.

At block 516, the control electronics 105 adjusts a current used to drive the pump laser 100 in order to adjust the pump power $P_{pump}$ output from the pump laser 100. The adjustment in current based on a change in the calculated power ratio from the previously calculated power ratio.

Example Embodiments

Example 1 includes a rare-earth-doped-fiber light source with wavelength stability, the rare-earth-doped-fiber light source comprising: a rare-earth doped fiber used as an active medium for the broadband light source, the rare-earth doped fiber having a host material and a cross-sectional structure, the cross-sectional structure of the rare-earth doped fiber including a fiber core doped with rare-earth ions; an undoped fiber having the same host material and the same cross-sectional structure as the rare-earth doped fiber, the cross-sectional structure of the undoped doped fiber including a rare-earth-dopant-free fiber core, wherein the undoped fiber and the rare-earth doped fiber are placed in proximity to each other, wherein the length of the undoped fiber is one of the same as that of the doped fiber or optimized to match the radiation sensitivity of the doped fiber; a coupler configured to direct a first portion of pump power from a pump laser to the undoped fiber, wherein the first portion of pump power was twice passed through the coupler; and a wavelength division multiplexer configured to input a second portion of pump power from the pump laser to the rare-earth doped fiber.

Example 2 includes the rare-earth-doped-fiber light source of Example 1, wherein the coupler comprises a first arm, a second arm, a third arm, and a fourth arm, wherein the undoped fiber is configured to receive output from the second arm, and wherein an input arm of the wavelength division multiplexer is coupled to the fourth arm of the coupler, the rare-earth-doped-fiber light source further comprising: a reflector positioned at an output of the third arm to reflect a portion of the pump power back through the third arm, through the coupler, to the second arm of the coupler; a first photodetector positioned to detect a portion of the optical beam transmitted by the reflector, the first photodetector operable to output a first feedback signal; and a second photodetector positioned at the output end of the undoped fiber, the second photodetector operable to output a second feedback signal.

Example 3 includes the rare-earth-doped-fiber light source of Example 2, further comprising: the pump laser coupled to the first arm of the coupler.

Example 4 includes the rare-earth-doped-fiber light source of any of Examples 1-3, wherein the wavelength division multiplexer includes an input arm, a first-output arm, and a second-output arm, wherein the rare-earth doped fiber is optically pumped by the second portion of the pump power from the pump laser output from the first-output arm, and wherein amplified spontaneous emission having a stable mean wavelength is output from the second-output arm.

Example 5 includes the rare-earth-doped-fiber light source of any of Examples 1-4, further comprising: control electronics configured to receive a first feedback signal from a first photodiode and a second feedback signal from a second photodiode, wherein the control electronics calculates a ratio of the second feedback signal to the first feedback signal, and wherein, if the control electronics determines the ratio has changed, the control electronics adjusts a pump current applied to the pump laser to maintain a mean wavelength of the rare-earth-doped-fiber light source.

Example 6 includes the rare-earth-doped-fiber light source of any of Examples 1-5, further comprising: a terminating fiber to absorb light emitted from an output end of the rare-earth doped fiber.

Example 7 includes an interferometric fiber optic gyroscope, comprising: a rare-earth-doped-fiber light source configured to emit broadband amplified spontaneous emission with a stable mean wavelength; a coupler configured to direct a first portion of the amplified spontaneous emission to an optical splitter and a second portion of the amplified spontaneous emission to a photodetector; the optical splitter operable to split the first portion of the amplified spontaneous emission into a clockwise optical beam and a counterclockwise beam; and a gyroscopic sensing coil optically coupled with the optical splitter, the gyroscopic sensing coil operable to output rate signals indicative of a rotation rate of the gyroscopic sensing coil.

Example 8 includes the interferometric fiber optic gyroscope of Example 7, wherein the coupler is a first coupler, and wherein the rare-earth-doped-fiber light source comprises: a rare-earth doped fiber used as an active medium for the broadband light source, the rare-earth doped fiber having a host material and a cross-sectional structure, the cross-sectional structure of the rare-earth doped fiber including a fiber core doped with rare-earth ions; an undoped fiber having the same host material and the same cross-sectional structure as the rare-earth doped fiber, the cross-sectional structure of the undoped doped fiber including a rare-earth-dopant-free fiber core, wherein the undoped fiber and the rare-earth doped fiber are placed in proximity to each other, wherein the length of the undoped fiber is one of the same as that of the doped fiber or optimized to match the radiation sensitivity of the doped fiber; a second coupler configured to direct a first portion of pump power from a pump laser to the undoped fiber, wherein the first portion of pump power was twice passed through the second coupler; and a wavelength division multiplexer configured to input a second portion of pump power from the pump laser to the rare-earth doped fiber.

Example 9 includes the interferometric fiber optic gyroscope of Example 8, wherein the second coupler comprises a first arm, a second arm, a third arm, and a fourth arm, wherein the undoped fiber is configured to receive output from the second arm, and wherein an input arm of the wavelength division multiplexer is coupled to the fourth arm of the second coupler, the rare-earth-doped-fiber light source further comprising: a reflector positioned at an output of the third arm to reflect a portion of the pump power back through the third arm, through the second coupler, to the second arm of the second coupler; a first photodetector positioned to detect a portion of the optical beam transmitted by the reflector, the first photodetector operable to output a first feedback signal; and a second photodetector positioned at the output end of the undoped fiber, the second photodetector operable to output a second feedback signal.

Example 10 includes the interferometric fiber optic gyroscope of Example 9, further comprising: a third photodiode configured to output a third feedback signal to the control system, the third feedback signal being indicative of the second portion of the amplified spontaneous emission; a fourth photodiode configured to output a fourth feedback signal to the control system, the fourth feedback signal containing information of the rotation rate of the gyroscopic sensing coil; and the control system configured to receive the first feedback signal from the first photodiode, the second feedback signal from the second photodiode, the third feedback signal from the third photodiode, and the fourth feedback signal from the fourth photodiode, wherein the control system calculates a ratio of the second feedback signal to the first feedback signal and adjusts a current applied to the pump laser to maintain the mean wavelength of the rare-earth-doped-fiber light source if the ratio changes, and wherein the control system determines the rotation rate of the gyroscopic sensing coil based on the third feedback signal and the fourth feedback signal.

Example 11 includes the interferometric fiber optic gyroscope of any of Examples 9-10, further comprising: a control system configured to receive the first feedback signal from the first photodiode and the second feedback signal from the second photodiode, wherein the control system calculates a ratio of the second feedback signal to the first feedback signal and adjusts a current applied to the pump laser to maintain the mean wavelength of the rare-earth-doped-fiber light source if the ratio changes.

Example 12 includes the interferometric fiber optic gyroscope of any of Examples 8-11, further comprising: the pump laser coupled to the first arm of the second coupler.

Example 13 includes the interferometric fiber optic gyroscope of any of Examples 8-12, wherein the wavelength division multiplexer includes an input arm, a first-output arm, and a second-output arm, wherein the rare-earth doped fiber is optically pumped by the second portion of the pump power from the pump laser output from the first-output arm, and wherein amplified spontaneous emission having a stable mean wavelength is output from the second-output arm.

Example 14 includes the interferometric fiber optic gyroscope of Example 13, further comprising an isolator coupled to isolate the second-output arm of the wavelength division multiplexer from an input arm of the first coupler.

Example 15 includes the interferometric fiber optic gyroscope of any of Examples 8-14, further comprising: a terminating fiber to absorb light emitted from the output end of the rare-earth doped fiber.

Example 16 includes the interferometric fiber optic gyroscope of any of Examples 7-15, wherein the optical splitter is an integrated optical chip.

Example 17 includes a method to reduce impact of radiation on a mean wavelength of a rare-earth-doped-fiber light source, the method comprising: placing an undoped fiber in proximity with a rare-earth doped fiber, the undoped fiber having a same cross-sectional structure, and a same host material as the rare-earth doped fiber, the rare-earth doped fiber having rare-earth ions in a fiber core of the rare-earth doped fiber and the undoped fiber being independent of rare-earth ions in a fiber core of the undoped fiber; passing a pump beam from a pump laser through a coupler, wherein a first portion of the pump power is coupled into a first photodiode and a second portion of the pump power optically pumps the rare-earth doped fiber; coupling the pump power passed twice through the coupler to the undoped fiber; and detecting an output from the undoped fiber at a second photodiode.

Example 18 includes the method of Example 17, further comprising: providing outputs from the first photodiode and the second photodiode to control electronics; calculating a power ratio based on the outputs from the first photodiode and the second photodiode; and adjusting a current used to drive the pump laser to adjust the pump power output from the pump laser based on a change in the calculated power ratio.

Example 19 includes the method of any of Examples 17-18, wherein placing an undoped fiber in proximity with a rare-earth doped fiber comprises: attaching the undoped fiber in proximity with the rare-earth doped fiber with attachment fixtures.

Example 20 includes the method of any of Examples 17-19, further comprising: selecting the length of the rare-earth doped fiber to provide a sensitivity slope in an appropriate range for the optimal control of the mean wavelength of the rare-earth-doped-fiber light source.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A rare-earth-doped-fiber light source with wavelength stability, the rare-earth-doped-fiber light source comprising:
   a rare-earth doped fiber used as an active medium for the broadband light source, the rare-earth doped fiber having a host material and a cross-sectional structure, the cross-sectional structure of the rare-earth doped fiber including a fiber core doped with rare-earth ions;
   an undoped fiber having the same host material and the same cross-sectional structure as the rare-earth doped fiber, the cross-sectional structure of the undoped doped fiber including a rare-earth-dopant-free fiber core, wherein the undoped fiber and the rare-earth doped fiber are placed in proximity to each other, wherein the length of the undoped fiber is one of the same as that of the doped fiber or optimized to match a radiation sensitivity of the doped fiber;
   a coupler configured to direct a first portion of pump power from a pump laser to the undoped fiber, wherein the first portion of pump power was twice passed through the coupler; and
   a wavelength division multiplexer configured to input a second portion of pump power from the pump laser to the rare-earth doped fiber.

2. The rare-earth-doped-fiber light source of claim 1, wherein the coupler comprises a first arm, a second arm, a third arm, and a fourth arm, wherein the undoped fiber is configured to receive output from the second arm, and wherein an input arm of the wavelength division multiplexer is coupled to the fourth arm of the coupler,
   the rare-earth-doped-fiber light source further comprising:
   a reflector positioned at an output of the third arm to reflect a portion of the pump power back through the third arm, through the coupler, to the second arm of the coupler;
   a first photodetector positioned to detect a portion of the optical beam transmitted by the reflector, the first photodetector operable to output a first feedback signal; and
   a second photodetector positioned at the output end of the undoped fiber, the second photodetector operable to output a second feedback signal.

3. The rare-earth-doped-fiber light source of claim 2, further comprising:
   the pump laser coupled to the first arm of the coupler.

4. The rare-earth-doped-fiber light source of claim 1, wherein the wavelength division multiplexer includes an input arm, a first-output arm, and a second-output arm, wherein the rare-earth doped fiber is optically pumped by the second portion of the pump power from the pump laser output from the first-output arm, and wherein amplified spontaneous emission having a stable mean wavelength is output from the second-output arm.

5. The rare-earth-doped-fiber light source of claim 1, further comprising:
   control electronics configured to receive a first feedback signal from a first photodiode and a second feedback signal from a second photodiode, wherein the control electronics calculates a ratio of the second feedback signal to the first feedback signal, and wherein, if the control electronics determines the ratio has changed, the control electronics adjusts a pump current applied to the pump laser to maintain a mean wavelength of the rare-earth-doped-fiber light source.

6. The rare-earth-doped-fiber light source of claim 1, further comprising:
   a terminating fiber to absorb light emitted from an output end of the rare-earth doped fiber.

7. An interferometric fiber optic gyroscope, comprising:
   a rare-earth-doped-fiber light source configured to emit broadband amplified spontaneous emission with a stable mean wavelength, the rare-earth-doped-fiber light source including:
   an undoped fiber formed from a first host glass and having a length;
   a rare-earth doped fiber formed from a second host glass that is the same as first host-glass and having the same length as the undoped fiber, wherein the undoped fiber and the rare-earth doped fiber are placed in proximity to each other;
   a first coupler configured to direct a first portion of pump power from a pump laser to the undoped fiber, wherein the first portion of pump power was twice passed through the second coupler; and
   a wavelength division multiplexer configured to input a second portion of pump power from the pump laser to the rare-earth doped fiber;
   a second coupler configured to direct a first portion of the amplified spontaneous emission to an optical splitter and a second portion of the amplified spontaneous emission to a photodetector;
   the optical splitter operable to split the first portion of the amplified spontaneous emission into a clockwise optical beam and a counterclockwise beam; and
   a gyroscopic sensing coil communicatively coupled with the optical splitter, the gyroscopic sensing coil operable to output rate signals indicative of a rotation rate of the gyroscopic sensing coil.

8. The rare-earth-doped-fiber light source of claim 7, wherein the first coupler comprises a first arm, a second arm, a third arm, and a fourth arm, wherein the undoped fiber is configured to receive output from the second arm, and wherein an input arm of the wavelength division multiplexer is coupled to the fourth arm of the first coupler,
   the rare-earth-doped-fiber light source further comprising:
   a reflector positioned at an output of the third arm to reflect a portion of the pump power back through the third arm, through the first coupler, to the second arm of the first coupler;
   a first photodetector positioned to input a portion of the optical beam transmitted by the reflector, the first photodetector operable to output first feedback signal; and
   a second photodetector positioned at the output end of the undoped fiber, the first photodetector operable to output second feedback signal.

9. The interferometric fiber optic gyroscope of claim 8, further comprising:

a third photodiode configured to output a third feedback signal to a control system, the third feedback signal being indicative of a second portion of the amplified spontaneous emission;

a fourth photodiode configured to output a fourth feedback signal to the control system, the fourth feedback signal containing information of the rotation rate of the gyroscopic sensing coil; and the control system configured to receive the first feedback signal from the first photodiode, the second feedback signal from the second photodiode, the third feedback signal from the third photodiode, and the fourth feedback signal from the fourth photodiode, wherein the control system calculates a ratio of the second feedback signal to the first feedback signal and adjusts a current applied to the pump laser to maintain the mean wavelength of the rare-earth-doped-fiber light source if the ratio changes, and wherein the control system determines the rotation rate of the gyroscopic sensing coil based on the third feedback signal and the fourth feedback signal.

10. The interferometric fiber optic gyroscope of claim 8, further comprising:

a control system configured to receive the first feedback signal from the first photodiode and the second feedback signal from the second photodiode, wherein the control system calculates a ratio of the second feedback signal to the first feedback signal and adjusts a current applied to the pump laser to maintain the mean wavelength of the rare-earth-doped-fiber light source if the ratio changes.

11. The interferometric fiber optic gyroscope of claim 7, further comprising:

the pump laser coupled to the first arm of the first coupler.

12. The interferometric fiber optic gyroscope of claim 7, wherein the wavelength division multiplexer includes an input arm, a first-output arm, and a second-output arm, wherein the rare-earth doped fiber is optically pumped by the second portion of the pump power from the pump laser output from the first-output arm, and wherein amplified spontaneous emission having a stable mean wavelength is output from the second-output arm.

13. The interferometric fiber optic gyroscope of claim 12, further comprising an isolator coupled to isolate the second-output arm of the wavelength division multiplexer from an input arm of the second coupler.

14. The interferometric fiber optic gyroscope of claim 7, further comprising:

a terminating fiber to absorb light emitted from the output end of the rare-earth doped fiber.

15. The interferometric fiber optic gyroscope of claim 7, wherein the optical splitter is an integrated optical chip.

16. A method to reduce impact of radiation on a mean wavelength of a rare-earth-doped-fiber light source, the method comprising:

placing an undoped fiber in proximity with a rare-earth doped fiber, the undoped fiber having a same cross-sectional structure, and a same host material as the rare-earth doped fiber, the rare-earth doped fiber having rare-earth ions in a fiber core of the rare-earth doped fiber and the undoped fiber being independent of rare-earth ions in a fiber core of the undoped fiber;

passing a pump beam from a pump laser through a coupler, wherein a first portion of the pump power is coupled into a first photodiode and a second portion of the pump power optically pumps the rare-earth doped fiber;

coupling the pump power passed twice through the coupler to the undoped fiber; and detecting an output from the undoped fiber at a second photodiode.

17. The method of claim 16, further comprising:

providing outputs from the first photodiode and the second photodiode to control electronics;

calculating a power ratio based on the outputs from the first photodiode and the second photodiode; and adjusting a current used to drive the pump laser to adjust the pump power output from the pump laser based on a change in the calculated power ratio.

18. The method of claim 16, wherein placing an undoped fiber in proximity with a rare-earth doped fiber comprises:

attaching the undoped fiber in proximity with the rare-earth doped fiber with attachment fixtures.

19. The method of claim 16, further comprising:

selecting the length of the rare-earth doped fiber to provide a sensitivity slope in an appropriate range for the optimal control of the mean wavelength of the rare-earth-doped-fiber light source.

* * * * *